United States Patent [19]

Hamlin

[11] Patent Number: 4,615,514

[45] Date of Patent: Oct. 7, 1986

[54] HOLDING APPARATUS AND METHOD FOR SECURELY POSITIONING MEMBERS TO BE JOINED BY WELDING OR THE LIKE

[76] Inventor: Jerry J. Hamlin, 2356 N. 64th St., Mesa, Ariz. 85205

[21] Appl. No.: 696,069

[22] Filed: Jan. 29, 1985

[51] Int. Cl.$^4$ .............................................. B25B 5/14
[52] U.S. Cl. ......................................... 269/41; 269/49
[58] Field of Search .................... 269/47, 48.1, 49, 52, 269/41; 29/271; 294/97

[56] References Cited

U.S. PATENT DOCUMENTS

| | | | |
|---|---|---|---|
| 1,463,564 | 7/1923 | Taylor | 269/47 |
| 2,523,519 | 9/1950 | Reeves | 269/48.1 |
| 3,057,651 | 10/1962 | Lloyd | 294/97 |
| 3,284,125 | 11/1966 | Blaske | 294/97 |
| 4,085,958 | 4/1978 | Gaudette | 294/97 |
| 4,175,735 | 11/1979 | Griffin | 269/49 |
| 4,304,398 | 12/1981 | Crowell | 269/48.1 |

Primary Examiner—Robert C. Watson
Attorney, Agent, or Firm—Harry M. Weiss & Associates

[57] ABSTRACT

A tool for positioning a pair of objects with respect to each other is realized that comprises a toggle assembly attached to one end of a threaded shaft. The toggle assembly includes a pair of arm members pivotally attached about the shaft which are normally held in an open position wherein the arm members are jointed together end to end. A collapsing assembly is provided that is connected with the toggle assembly and disposed about the threaded shaft for causing the arm members to be collapsed about the threaded shaft, into a closed position. In this manner, the tool can be either inserted or removed from a hollow cylindrical object when the tool is closed into another hollow object. After insertion the first object is held securely to the second by allowing the toggle assembly to open prevention removal of the tool. Thereafter, the tool can be removed from both objects by collapsing the toggle assembly.

11 Claims, 6 Drawing Figures

U.S. Patent   Oct. 7, 1986   4,615,514
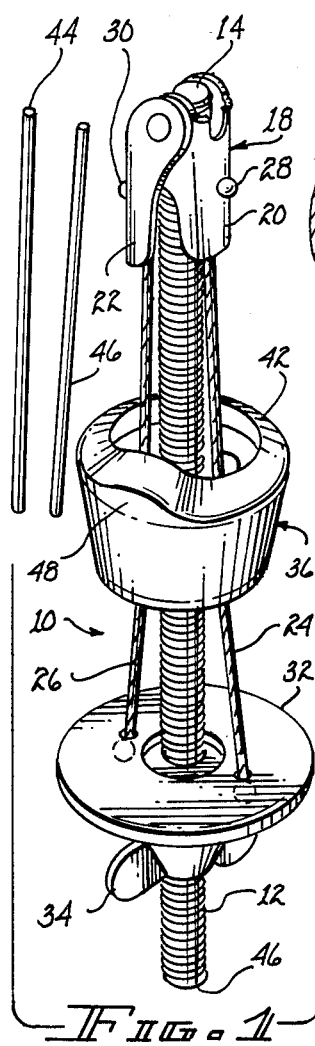
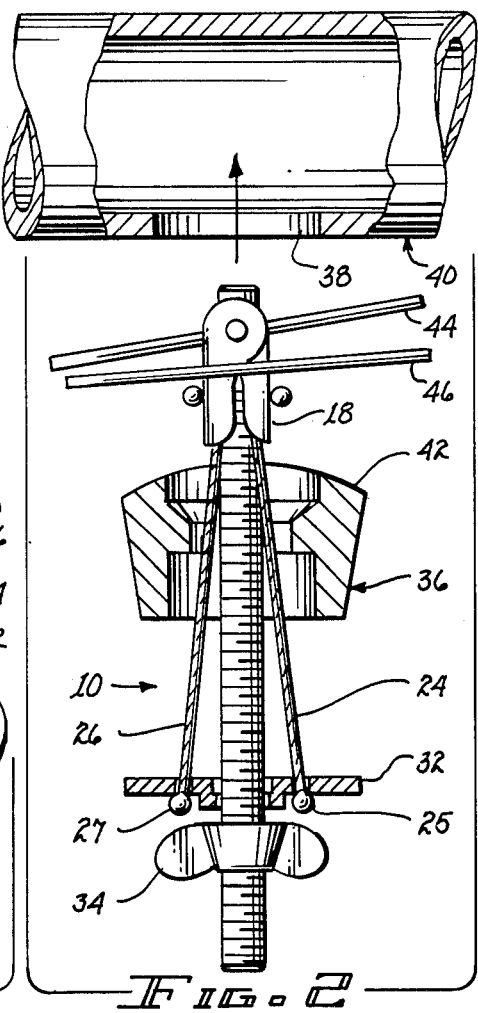
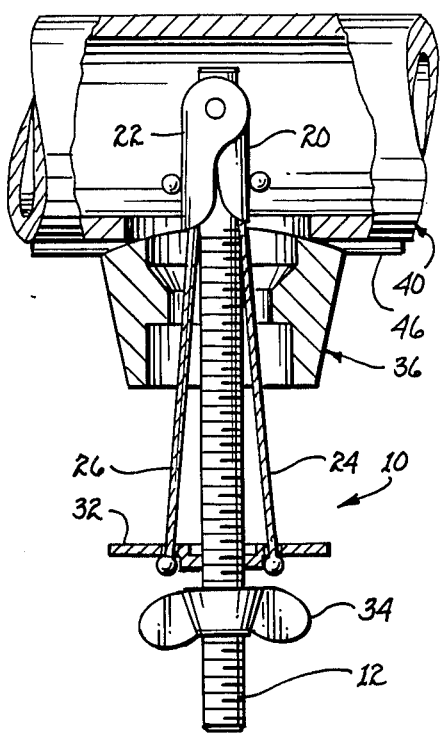
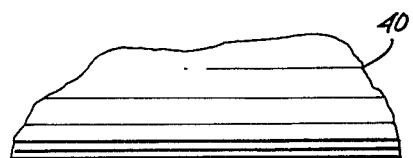
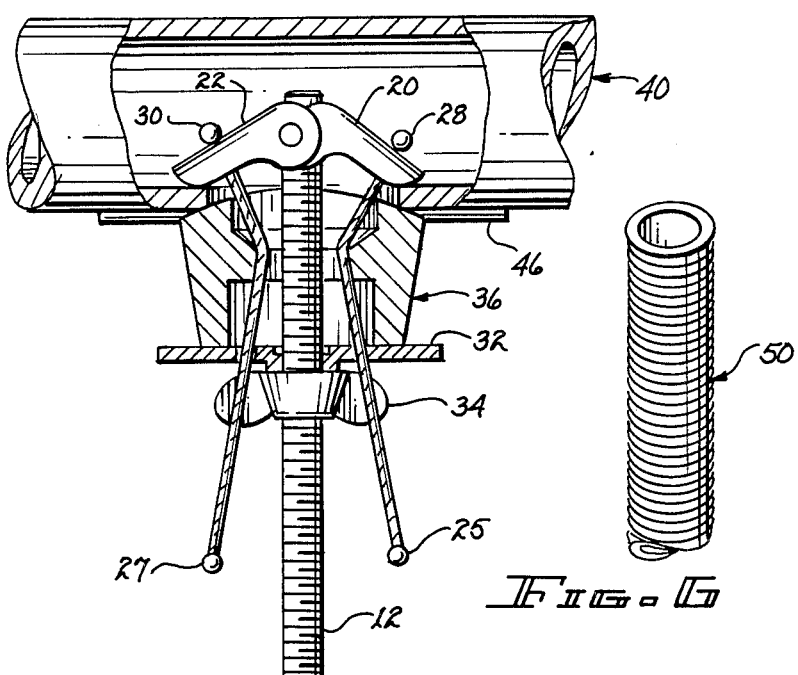
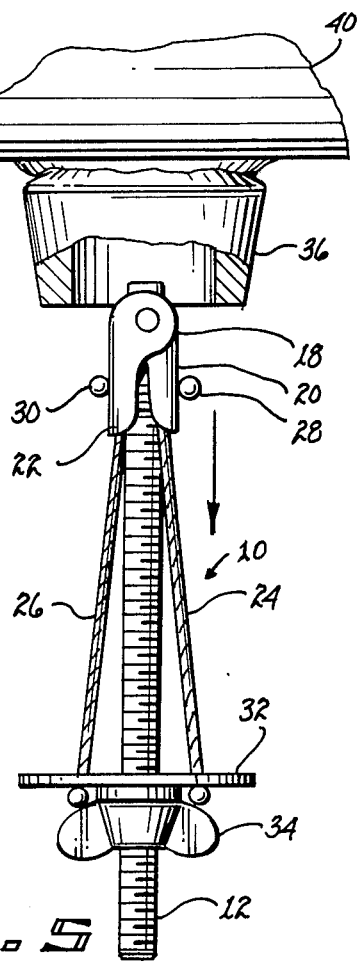

HOLDING APPARATUS AND METHOD FOR SECURELY POSITIONING MEMBERS TO BE JOINED BY WELDING OR THE LIKE

BACKGROUND OF THE INVENTION

The present invention relates to welding applications and techniques and, more particularly, to an assembly and method for securely positioning objects with respect to each other that are to be welded on or the like.

It is usually advantageous to securely position and hold objects to one another during the welding or joining together in order to obtain a good seal or weld joint therebetween. For example, it is often necessary for plumbers and other practioners to have to weld pipes and pipe junction members together during plumbing applications. For instance, it might be required to weld a universal sockalet type pipe junction member to a main flow pipe line to form a tee flow junction. In this application, the sockalet pipe piece would be positioned above an aperture in the main pipe line and welded thereto. Thus, it is important that the sockalet be securely held in position with respect to the main pipe during the welding operation.

Hence, there exists a need for an apparatus or tool that can securely hold in position the sockalet pipe junction, for example, with respect to the aperture in the main pipe in order to obtain a good welding joint to prevent leaking therefrom. It may also be desirable to allow the plumbing system to be purged during the welding operation by flushing or the like through one or the other, or even both joining pipe members while the holding tool is in place.

SUMMARY OF THE INVENTION

Accordingly, it is an object of the present invention to provide an improved holding apparatus that may be utilized to securely position one object with respect to another.

Another object of the present invention is to provide an improved tool and method for securely positioning members to be welded together or the like.

Still another object of the present invention is to provide an improved tool that is removeably insertable through a hollow member to securely hold the member over an aperture formed in a second hollow member during welding thereof or the like.

A further object of the present invention is to provide a tool that can securely position a universal pipe junction member over an aperture of a main pipe during the welding together thereof.

In accordance with the above and other objects there is provided an apparatus comprising a toggle assembly including a pair of arm members pivotally attached to one end of a threaded shaft wherein the arm members are normally held in an open position such that they are jointed together end to end. A collapsing assembly is movably disposed about the threaded shaft and connected to the toggle assembly to permit the arm members to be collapsed about the threaded shaft.

A feature of the invention is that the arm members can be collapsed to permit the apparatus to be removably inserted through a sockalet pipe junction into a main pipe after which the arm members are allowed to be opened. In this manner the sockalet can be securely held in position with respect to main pipe by threading a washer assembly against the sockalet to permit welding of thereof to the main pipe. Another feature of the invention is that the threaded shaft can be made of hollow rod stock to permit the pipe system to be purged during the welding operation.

BRIEF DESCRIPTION OF THE DRAWINGS

FIG. 1 is a perspective view of the holding apparatus of the preferred embodiment inserted through a member to be welded in accordance with the present invention;

FIG. 2 is a perspective and partial cross sectional view of the apparatus of FIG. 1 illustrating insertion thereof into a pipe member;

FIG. 3 is a partial perspective and cross sectional view of the apparatus of FIG. 1 with the joining members abutted to each other;

FIG. 4 is a cross sectional view illustrating the apparatus of the present invention inserted and securely holding the joining members positioned together;

FIG. 5 is a partial cross sectional and perspective view illustrating the removal of the apparatus of the present invention from the joining members; and FIG. 6 is a perspective view of a hollow shaft member for use with another embodiment of the invention.

DETAILED DESCRIPTION OF THE PREFERRED EMBODIMENT

Turning now to the figures there is illustrated apparatus or tool 10 of the subject invention. It is to be understood that the like components in the drawings are referenced by the same reference numerals. Apparatus 10 is welding tool aide that is useful for positioning cylindrical objects with respect to each other to permit welding thereof as will be fully explained. As illustrated, apparatus 10 is comprised of a threaded rod or shaft 12 which is cylindrical in shape having distol and proximal ends 14 and 16. A toggle assembly 18 is secured to distol end 14 which includes a pair of arm-like members 20 and 22 that are pivotally attached to each others about a pivotal axis of rod 12. Toggle assembly 18 is conventional in structure and includes a spring mechanism not shown, as understood, that normally keeps arm members 20 and 22 spread apart or joined together end to end as partially shown in FIG. 4. Each arm member has an aperture formed therethrough, through which a flexible cable 24 and 26 is disposed. Each cable 24 and 26 is attached to its respective arm member 20 and 22 by knurled knobs 28 and 30. Each cable 24 and 26 is of a predetermined length and is disposed through a respective aperture formed through washer 32 which apertures are dramatically oppored to each other. Washer 32 includes a central aperture through which threaded rod 12 is disposed. A wing nut 34 is threaded onto the proximal end 16 of threaded rod 12. Cables 24 and 26 along with washer 32 and nut 34 are referred to as a collapsing assembly in the further description of the invention. Washer 32 may be retained to toggle assembly 18 by knotting the ends 25 and 27 of cables 24 and 26 which are disposed through the apertures of washer 32.

As illustrated in FIG. 1, tool 10 has been inserted through a universal hollow pipe junction member or sockalet 36. Threaded rod 12 is inserted through pipe junction member 36 by collasping pivoted arm members 20 and 22 to a closed position about rod 12. The pivoted arm members 20 and 22 can be collapsed physically by hand or by pulling down on wire cables 24 and 26 to force the arm members 20 and 22 closed. When in a closed position the circumference about the arm members 20 and 22 is smaller than the inner diameters of both pipe junction member 36 and the diameter of the aperture 38 of pipe member 40.

As illustrated in FIGS. 2 and 3, after toggle assembly 18 and rod 12 have been inserted through pipe junction member 36, toggle assembly 18 is inserted through aperture 38 of pipe 40. The adjoining end 42 of pipe junction member 36 to be positioned above aperture 38 is shown as being contoured to permit spacer rods 44 and 46 to fit through concaved side wall position 48. In this manner, pipe junction member 36 is spaced from pipe menber 40 a predetermined distance by spacer rods 44 and 46 as illustrated in FIGS. 2 and 3.

After toggle assembly 18 is inserted within pipe member 40, collapser means on cables 24 and 26 are released to allow arm members 20 and 22 to open wherein each arm member extends beyond the periphery of aperture 38. Hence, welding tool 10 is held to pipe 40. Next, pipe junction member is securely held in position over aperture 38 by abutting washer 32 thereagainst and threading wing nut 34 up against washer 32 as illustrated in FIG. 4. The actual sequential steps in abutting pipe junction member 36 against pipe 40, abutting washer 32 and wing nut 34 up against member 36 is immaterial to the invention. One, for instance, might push pipe junction member 36 and washer 32 together up against spacer tods 44 and 46 and hold the assembly together until wing nut 34 is threaded tightly against washer 32, or one might pull against toggle assembly 18 after insertion into pipe 40 while wing nut 34 is firmly and securely positioned as described above.

After pipe junction member 36 is securely positioned above aperture 38 of pipe 40, it can be spot welded thereto. Thereafter, space rods 44 and 46 can be removed and pipe junction member can then be completely welded to pipe 40 as shown in FIG. 5. Upon completion of welding of the two pipe members 36 and 40 together, tool 10 is removed by unthreading wing nut 34 and pulling down on cables 24 and 26. This action again collapses arm members 18 and 20 to permit removal of tool 10 from pipe members 36 and 40.

Threaded rod 12 may be made of a solid shaft material or may be made of a hollow spindle such as illustrated in FIG. 6. Hollow shaft 50 permits purging of the adjoining pipe member system during welding if desired.

Hence, what has been described above is a novel apparatus and method for securely positioning a pair of cylindrical objects with respect to each other to permit joining thereof by welding or the like. Thus, while a particular embodiment of the invention has been shown and described, it is understood that modifications may be made and it is therefore intended for the appended claims to cover all such modifications as fall within the spirit and scope of the invention.

What is claimed is:

1. Holding apparatus, comprising:
a threaded shaft member;
toggle assembly means attached at one end of said threaded shaft member including first and second arm members pivotally attached to one another about a pivotal axis, said first and second arm members are jointed end to end;
collapsing means coupled to said toggle assembly means and being movably disposed about said threaded shaft member for causing said first and second arm members to be inwardly collapsed about said pivotal axis into a closed position, said collapsing means includes:
a washer means having a central aperture through which said threaded shaft member is disposed and a pair of apertures oppositely positioned through said washer member; and
collapse means connected to said first and second arm members connected to said first and second arm members of said toggle assembly means and mounted through said pair of apertures of said washer member for causing said first and second arm members to be collapsed.

2. The holding apparatus of claim 1 wherein:
said first and second arm members each leave an aperture formed therein; and
said collapse means includes a pair of cables disposed respectively through said pair of apertures of said washer member with the first member of said pair of cables being fixedly disposed through said aperture of said first arm member and the second one of said pair of cables being fixedly disposed through said aperture of said second arm member.

3. The holding apparatus of claim 2 wherein said collapsing means includes threaded nut means having a central aperture through which said threaded shaft member is threaded for positioning said washer member along the length of said threaded shaft member with respect to said toggle assembly means.

4. The holding apparatus of claim 3 wherein said threaded shaft member comprises a solid rod member.

5. The holding apparatus of claim 3 wherein said threaded shaft member comprises a hollow rod member.

6. A holding assembly for positioning a hollow pipe joining member over an aperture of a main hollow pipe member during welding thereof or the like comprising the holding apparatus of claim 1 and including:
said toggle assembly means being disposed interiorly of said main hollow pipe member through said aperture thereof;
spacing rod means;
said threaded shaft member being disposed through the hollow pipe joining member such that said hollow pipe joining member is positioned against but displaced from said aperture of the main hollow pipe member by said spacing rod means; and
said collapsing means holding the hollow pipe joining member in said position described above.

7. The holding assembly of claim 6 wherein said holding apparatus including said toggle assembly is removed from the hollow pipe joinging member and the main hollow pipe member by having said collapsing means closing said first and second arm members of said toggle assembly means.

8. An assembly for positioning a pipe junction member over an aperture of a pipe member during joining thereof such as by welding or the like, comprising:
a threaded rod having a proximal and distal end, said rod being sized in diameter to be disposed through the pipe junction member during positioning thereof;
toggle assembly means attached to said distal end of said threaded rod including a pair of arm members pivotally attached about a pivotal axis wherein said arm members are jointed together end to end when in an open position, said arm members being disposed within the pipe member through the aperture thereof during positioning;

collapsing assembly means being threaded onto said proximal end of said threaded rod and being connected to said toggle assembly means for both securely holding the pipe junction member over the aperture of the pipe member during positioning and collapsing said pair of arm members of said toggle assembly means about said pivotal axis to allow insertion and removal thereof from the pipe member and the pipe junction member, each one of said pair of arm members of said toggle assembly means include an aperture formed therethrough, said collapsing assembly means includes;

a washer having a central aperture through which said threaded rod is disposed and a pair of apertures oppositely formed thereon; and collapser means disposed through said pair of apertures and connected to said toggle assembly means through said apertures of said pair of arm members of said toggle assembly means.

9. The assembly of claim 8 wherein said collapsing assembly means includes:

a threaded nut threaded onto said proximal end of said threaded rod on which said washer rests; and said collapser means including a pair of flexible cables, each cable being disposed respectively through a respective aperture of said apertures formed in said pair of arm members of said toggle assembly means and said washer, each cable being connected to its respective arm members wherein said arm members are collapsed to a closed position about said pivotal axis as said cables are pulled.

10. The assembly of claim 9 including spacer bar means for spacing the pipe junction member from the pipe member as the pipe junction member is held over the aperture of the pipe member during positioning.

11. The assembly of claim 10 wherein said threaded rod is hollow to permit purging of the joined pipe junction member and pipe member.

* * * * *